United States Patent [19]

Bormans

[11] Patent Number: 5,325,482
[45] Date of Patent: Jun. 28, 1994

[54] METHOD AND SYSTEM FOR CHARTING MAINS NETWORKS ON A NEW MAP

[75] Inventor: Johannes P. H. G. Bormans, Esch, Netherlands

[73] Assignee: Provinciale Noordbrabantse Energie Maatschappij N.V., Netherlands

[21] Appl. No.: 6,701

[22] Filed: Jan. 21, 1993

Related U.S. Application Data

[63] Continuation of Ser. No. 739,175, Aug. 1, 1991, abandoned.

[30] Foreign Application Priority Data

Aug. 2, 1990 [NL] Netherlands ................ 90/01757

[51] Int. Cl.$^5$ ................................. G06F 5/01
[52] U.S. Cl. ................... 395/161; 395/135; 395/138
[58] Field of Search ........... 395/161, 135, 138, 150, 395/133; 340/728, 734, 710, 993; 364/443

[56] References Cited

U.S. PATENT DOCUMENTS

| | | | |
|---|---|---|---|
| 4,661,811 | 4/1987 | Gray et al. | 340/744 |
| 4,791,572 | 12/1988 | Green, III et al. | 364/449 |
| 4,847,788 | 7/1989 | Shimada | 395/135 |
| 4,891,632 | 1/1990 | Chang | 340/710 |

OTHER PUBLICATIONS

1985 IEEE Computer Society Workshop on Computer Architecture for Pattern Analysis and Image Database Management, Miami Beach, Fla., 18-20 Nov. 1985, IEEE (New York, US), A. Maeda et al. "Application of Automatic Drawing Reader for the Utility Management System", pp. 139-145.

Computer & Graphics, vol. 4, No. 1, 1979, Pergamon Press Ltd. (GB), Y. Hazony: "Interactive Cartography-An Analytical Tool for Management Information Systems", pp. 63-75.

Primary Examiner—Gary V. Harkcom
Assistant Examiner—Michael S. Smith
Attorney, Agent, or Firm—Ostrolenk, Faber, Gerb & Soffen

[57] ABSTRACT

A method for charting onto a newly produced map mains network data from an old, existing map. It comprises the following steps. In a first memory part is stored the measured data for a new map. In a second memory part is stored the data of the old map including the data relating to mains networks. From the memory parts the new and the old map are read and displayed on a display. Reference points of the old map are moved until they coincide with the appropriate reference points of the new map. Finally, The network reference points moved with the reference points of the old map are interpolated so that the network data is included in the new map.

7 Claims, 1 Drawing Sheet

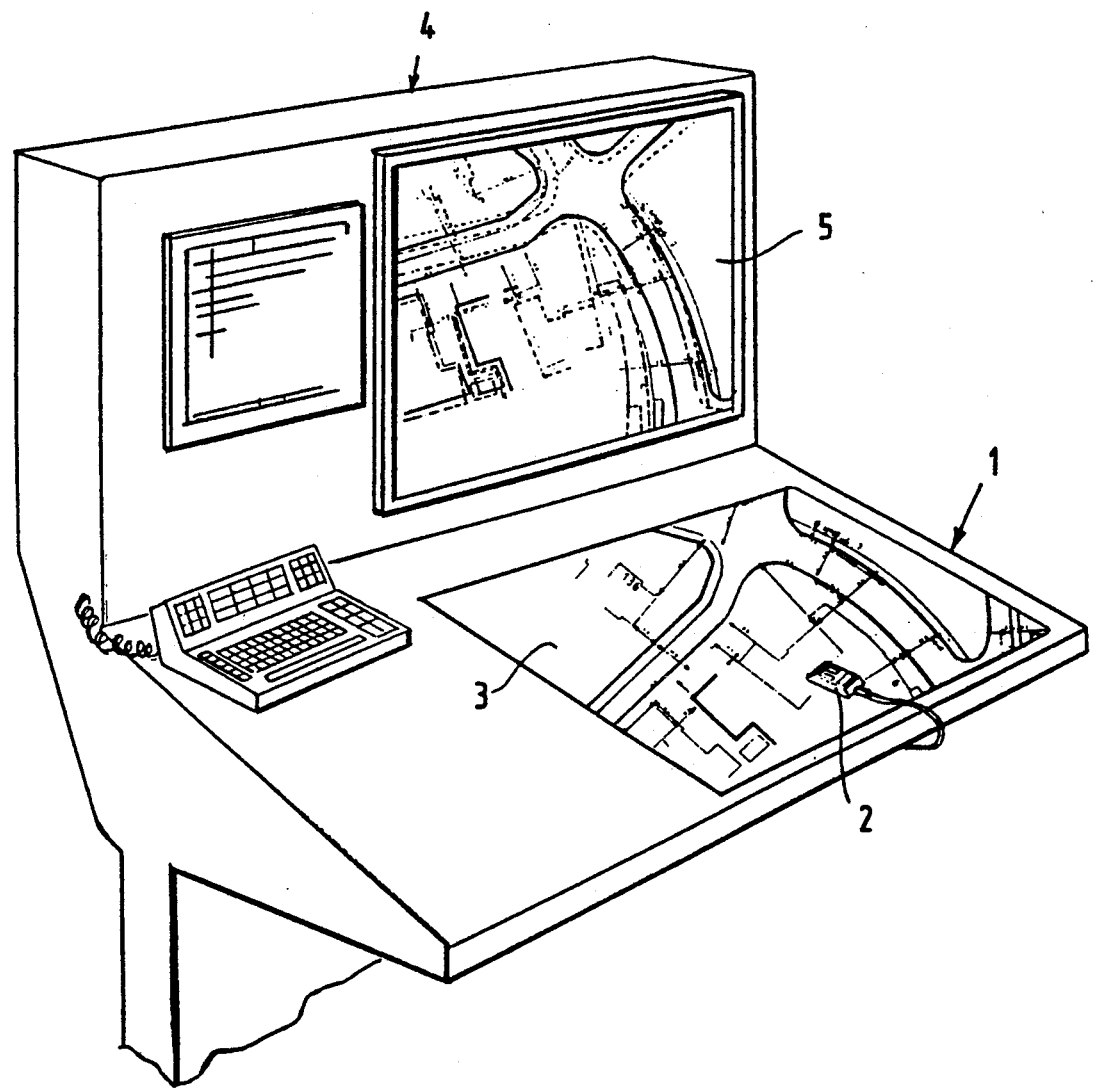

METHOD AND SYSTEM FOR CHARTING MAINS NETWORKS ON A NEW MAP

This is a continuation of application Ser. No. 07/739,175, filed on Aug. 1, 1991, now abandoned.

BACKGROUND AND SUMMARY OF THE INVENTION

Particularly in densely populated areas the infrastructure of gas and water pipes, waste pipes and electric cables and the like is becoming increasingly more complex. Public utilities have charted these mains networks during the last decades or centuries, wherein new networks are included in these maps. It has been found in practice that the data that can be derived from these maps is frequently inaccurate or incomplete, also on account of changes caused in part by building development etc.

In many areas projects have been started to re-map the topography of the network of pipes and cables, to store this in a memory and re-chart the mains networks on a new map from network reference points on the old map. Many old topographical maps were produced in each case according to different land surveying principles and often do not link up to each other. The contents of a new map measured in accordance with a determined principle can therefore be (slightly) shifted or distorted relative to a corresponding old map.

The present invention has for its object to shorten and facilitate the above stated lengthy and labor-intensive operations.

To this end the invention provides a method for charting onto a newly produced map mains networks from an old, existing map, comprising the following steps:

storing in a first memory part the measured data for a new map;

storing in a second memory part the data of the old map including the data relating to the mains networks included therein;

reading from the aforesaid memory parts the new and the old map and displaying the same on a display means;

moving reference points of the old map until these coincide with corresponding reference points of the new map; and interpolating the network reference points moved with the reference points of the old map so that the network data is included in the new map.

Thus avoided according to the present invention is the need to compare old maps and new maps by a draftsman who is also required to draw the new mains networks therein. Since ultimately a new drawing must be available in digital form in a memory, the map drawn in by hand would then have to be entered into the memory again using a so-called digitalizing table.

For example, the process of re-mapping the province of North Brabant in the Netherlands is of a magnitude which would require more than 100 man years. With the method proposed according to the invention, a time saving of 10-40% can be achieved.

BRIEF DESCRIPTION OF THE DRAWING

The sole FIGURE is a perspective of a system embodying the present invention.

DETAILED DESCRIPTION OF THE INVENTION

With reference to the annexed FIGURE, on a digitalizing device 1 an old map 3 is stored in a memory part incorporated in the cabinet 4, using a movable member 2. The device 1 is provided with a display means 5 on which a newly measured topographical map can be visibly displayed, in addition to the old map entered using the movable member 2. The old and new maps are preferably shown simultaneously in different colors on the display means 5.

The spacing of reference points for the mains networks are usually indicated on the map 3 relative to fixed points in the built-up area, wherein particularly the frontages of buildings are precisely indicated on the maps. When the reference points of the networks are linked to reference points of buildings with the aid of a code to be entered, the network data is automatically modified after an old map 3 has been converted to the data of the new topographical map. Between these network reference points straight or curved lines can then be drawn in per se known manner using an interpolation technique known in the software industry.

The obtained result is preferably checked. That is, an individual looks to see whether the interpolated mains networks can be accurate, that is, whether they take account of existing building patterns, roads, pavements etc.

Corrections can if necessary then still be made by hand using the movable member 2.

Although the embodiment shown makes use of a digitalizing device such as is commercially available from Siemens, the method according to the present invention can advantageously make use of work stations or personal computers with which graphic data can be entered, whereby the rather considerable computing time may be less expensively incurred.

I claim:

1. Method for charting onto a new map, mains networks from an old, existing map, comprising the steps of:

storing in a first memory part measured first data for the new map;

storing in a second memory part second data of the old map including data relating to mains networks included in the old map;

reading from the memory parts the first and second data and displaying the first and second data on a display means;

moving reference points of the old map until these coincide with reference points of the new map; and interpolating mains network reference points moved with the reference points of the old map so that mains network data is included in the new map, said interpolating step including consulting a code which indicates how said mains reference points of the old map are to be linked and made to coincide with said mains network data included in the new map.

2. Method as claimed in claim 1, including manually verifying interpolation of the mains network reference points.

3. System for charting onto a new map, mains network data from an old, existing map, comprising:

a first memory part for storing measured first data for a new map;

a second memory part for storing second data of the old map including data relating to mains networks included in the old map;

data entry means for entering map data into at least one of the first and second memory parts;

a display means for displaying thereon the new map, the old map and mains network data;

a processor including means for moving mains network reference points of the old map into the first memory part, said first and second memory parts, said data entry means and said display means being connected to communicate with said processor; and a control program loaded into the processor means for interpolating the moved mains network reference points to coincide with reference points of the new map so that the first data is included in the new map, and further means in said control program for consulting a code which indicates how said old mains network data is to be linked and made to coincide with said reference points of said new map.

4. The system of claim 3, wherein said data entry means comprises a movable member.

5. The system of claim 4, wherein said display means includes means for simultaneously displaying thereon said old map and said new map.

6. The system of claim 5, wherein said display means is effective for displaying said old map and new map in different colors.

7. The system of claim 3, wherein said data entry means comprises a digitalizing table.

* * * * *